No. 833,180. PATENTED OCT. 16, 1906.
U. H. SHADWELL.
LAP RING.
APPLICATION FILED SEPT. 2, 1905.

Inventor
U. H. Shadwell,

UNITED STATES PATENT OFFICE.

URANUS H. SHADWELL, OF CALDWELL, OHIO.

LAP-RING.

No. 833,180.  Specification of Letters Patent.  Patented Oct. 16, 1906.

Application filed September 2, 1905. Serial No. 276,841.

*To all whom it may concern:*

Be it known that I, URANUS H. SHADWELL, a citizen of the United States, residing at Caldwell, in the county of Noble and State of Ohio, have invented certain new and useful Improvements in Lap-Rings, of which the following is a specification.

This invention embodies improvements in that type of lap-rings or links which consist, primarily, of two hook members loosely or movably connected with one another and adapted to have the hook portions lie side by side to form an end of the link which is normally closed and which is adapted to be opened by proper manipulation of the members aforesaid.

The invention resides, primarily, in the peculiar formation of the members of the link whereby the same are firmly reinforced to sustain the strain which is received upon both of the hook members comprised in the link construction, wrought-iron being used necessarily and advantageously in the preferred embodiment of the invention.

For a full understanding of the invention and the merits thereof and also to acquire a knowledge of the details of construction of the means for effecting the result reference is to be had to the following description and accompanying drawings, in which—

Figure 1:
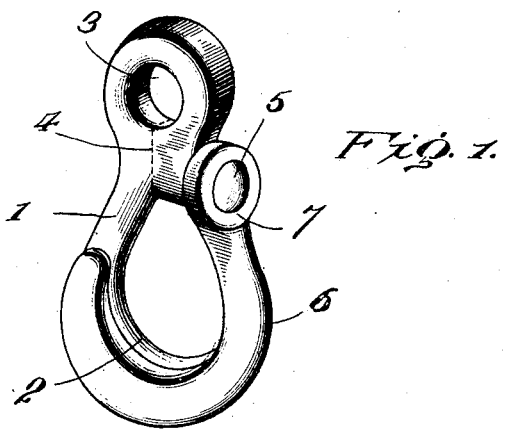
Figure 2:
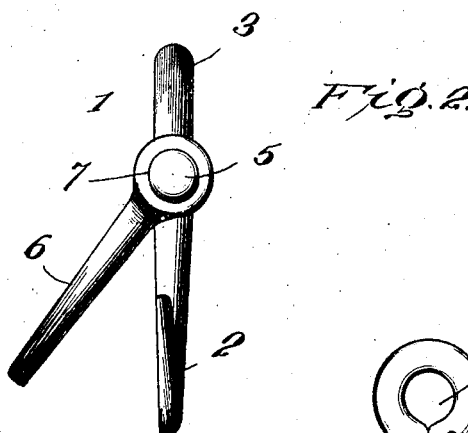
Figure 3:
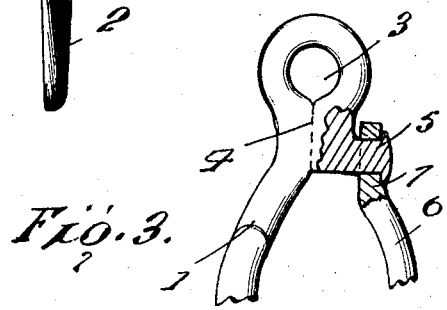

Figure 1 is a perspective view of the device. Fig. 2 is an edge view showing the construction of the joint. Fig. 3 is a broken sectional view bringing out more clearly the formation of the pivot-stud which connects the complemental hook member with the body of the device.

Corresponding and like parts are referred to in the following description and indicated in all the views of the drawings by the same reference characters.

In the drawings, the numeral 1 indicates the link-body, which consists principally of a hook 2, the shank of said hook 2 being bent inwardly intermediate of its ends and thence recurved at the end opposite the hook to form an eye 3. The extremity of the shank of the hook 2 adjacent to the eye 3 is curved inwardly toward the above-mentioned inwardly-curved portion, and both of the incurved portions are welded together, as at 4. After being welded as above described the end of the shank of the hook 2 near the eye 3 is thence bent outwardly from the welded portion 4 to form the stud 5, which passes through an end of a complemental hook member 6 and forms a pivot for the latter. The complemental hook member 6, as well as the hook 2, is flattened from opposite sides, so that the two members 2 and 6 will form an end of the link or device normally closed when said members lie in contact with one another. The stud 5 is so arranged that the hook member 6 is adapted for pivotal movement about an axis transverse to the axis of the shank of the hook 2. It will be understood that in order that the device may be as substantial as possible the end portion or stud 5 of the member 2 is not reduced in any way, its outer extremity being headed so as to prevent displacement of the member 6.

It is to be observed that in a link or device such as above described both of the hook members 2 and 6 are designed to sustain the strain incident to the use of the invention, and it is necessary that the connection between these parts be reinforced to the utmost degree in order that a practical and substantial device may be secured. In view of the fact that the member 6 receives the strain as well as the member 2 it will be readily appreciated that for many uses it is impractical to construct the link or ring device of cast metal because of the unreliability of the same when acting under tension and also when being used where it is likely to be given severe wear by reason of hard knocks or the like. In the present invention the article is manufactured from two pieces of wrought-iron, one of which is bent to form the hook 2, its shank, and the eye 3, and the hook 6, which is joined to the hook 2 in the manner hereinafter clearly set forth. The welded joint 4 effectively reinforces the hook members under the tensile strain incident to the use thereof and is greatly advantageous.

Having thus described the invention, what is claimed as new is—

As a new article of manufacture, a device of the class described consisting of a bar formed at one end with a hook, the shank of which is inwardly bent intermediate of its ends and thence extended and recurved to form an eye, the end portion of said shank adjacent to the eye being inwardly bent toward the first-mentioned inwardly-bent portion and welded thereto after which it is projected or bent outwardly to form a pivot-stud, and a complemental hook member made from a bar formed at one end with a hook at one side of the first-mentioned hook, an opposite end of the complemental hook member being formed with an eye receiving the pivot or stud aforesaid and admitting of axial movement of the complemental hook member transverse to the axis of the shank of the first-mentioned hook member, the outer extremity of the pivot or stud aforesaid being headed to prevent displacement or disconnection of the complemental hook member.

In testimony whereof I affix my signature in presence of two witnesses.

URANUS H. SHADWELL. [L. S.]

Witnesses:
W. T. SCOTT,
J. H. WILLSON.